No. 753,185. PATENTED FEB. 23, 1904.
I. J. WILLCOX.
COTTON PLANTER.
APPLICATION FILED MAR. 26, 1903.
NO MODEL. 2 SHEETS—SHEET 1.

Witnesses
Charles Morgan

Inventor
I. J. WILLCOX
By
Attorneys

No. 753,185. PATENTED FEB. 23, 1904.
I. J. WILLCOX.
COTTON PLANTER.
APPLICATION FILED MAR. 26, 1903.
NO MODEL. 2 SHEETS—SHEET 2.

Witnesses
Charles Morgan.

Inventor
I. J. Wilcox.
Attorneys

No. 753,185.

Patented February 23, 1904.

UNITED STATES PATENT OFFICE.

IRVIN JANSON WILLCOX, OF LENOX, GEORGIA, ASSIGNOR OF ONE-HALF TO ELISHA F. KINARD, OF LENOX, GEORGIA.

COTTON-PLANTER.

SPECIFICATION forming part of Letters Patent No. 753,185, dated February 23, 1904.

Application filed March 26, 1903. Serial No. 149,730. (No model.)

*To all whom it may concern:*

Be it known that I, IRVIN JANSON WILLCOX, a citizen of the United States, residing at Lenox, in the county of Berrien, State of Georgia, have invented certain new and useful Improvements in Cotton-Planters; and I do hereby declare the following to be a full, clear, and exact description of the invention, such as will enable others skilled in the art to which it appertains to make and use the same.

This invention relates to planters in general, and more particularly to the class of cotton-planters, the object of the invention being to provide a construction wherein the cotton-seed will be effectively fed from the hopper into the furrow and will be covered and rolled properly, a further object of the invention being to provide an implement in which the ground will be properly treated before the reception of the cotton-seed.

Additional objects and advantages of the invention will be evident from the following description.

Figure 1:
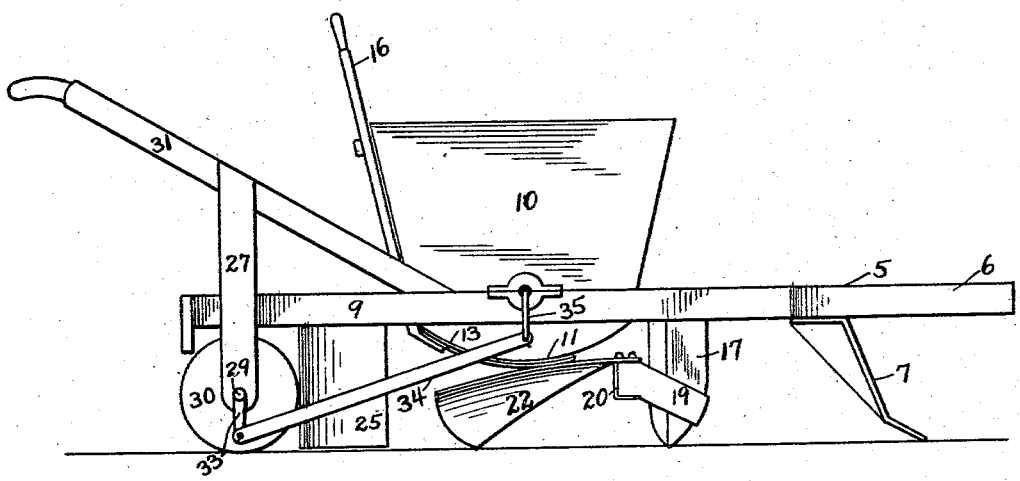
Figure 2:
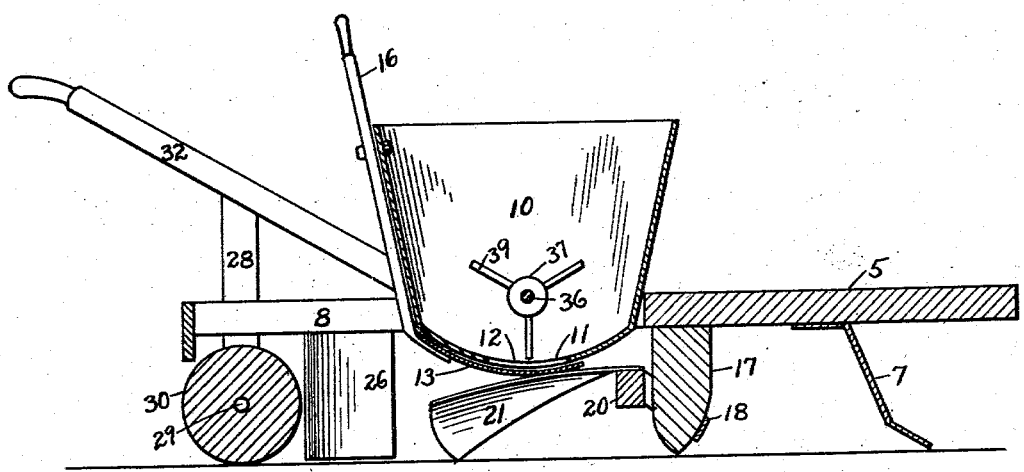
Figure 3:
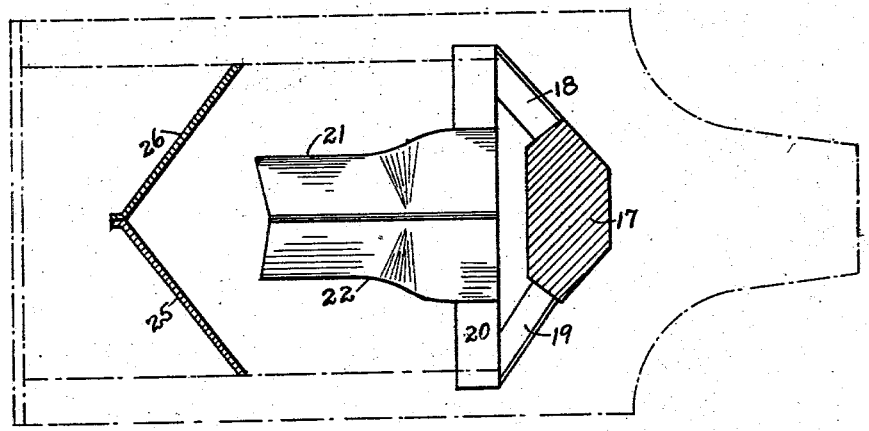
Figure 4:
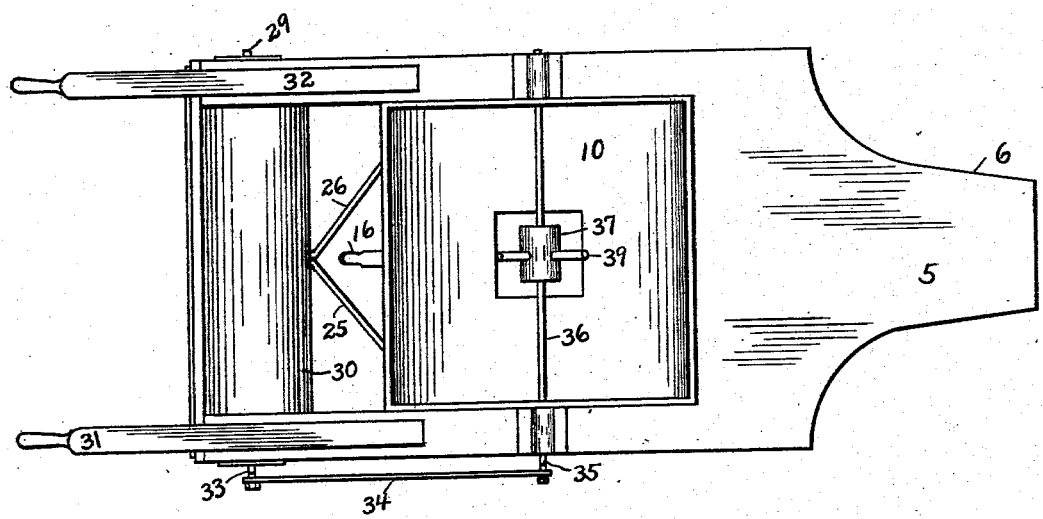

In the drawings forming a portion of this specification, and in which like numerals of reference indicate similar parts in the several views, Figure 1 is a side elevation of the implement, showing the mechanism for actuating the feeder. Fig. 2 is a longitudinal vertical section taken through the implement. Fig. 3 is a horizontal section taken just below the discharge-spout of the hopper. Fig. 4 is a top plan view of the implement.

Referring now to the drawings, the present invention comprises a platform 5, the front end portion of which is narrowed, as shown at 6, and has secured thereto a cultivator tooth or blade 7, which is adapted to enter the ground when the implement is in operation and form a furrow in which the cotton-seed is to be planted.

The rear portion of the platform 5 is bifurcated to form two arms 8 and 9, between which is disposed a hopper 10, having a depressed bottom plate 11, provided with a central discharge-opening 12, said hopper being adapted to receive the seed to be planted. The discharge-opening of the hopper is adapted to be partly or entirely covered by means of a plate 13, fixed to the lower end of a hand-lever 16, which is pivoted on the rear of the hopper and has its upper end provided with a handle to facilitate operation of the lever. As this lever is rocked the plate is moved with respect to the discharge-opening of the hopper and acts to cover or uncover it, thus varying the discharge therethrough.

Depending from the platform 5 at a point in line with the discharge-opening of the hopper and the cultivator-tooth is a furrow-opener 17, which is triangular in cross-section, while its front face at the lower end thereof is rounded in order that it may pass along the furrow that has been made by the cultivator-tooth, and by engaging the earth at the sides of the furrow move it outwardly to broaden the furrow. Plates 18 and 19 or a single plate including members corresponding thereto is secured to the front face of the furrow-opener above the rounded lower end thereof, these members extending rearwardly at right angles to each other and with their lower edges horizontal and at such an elevation as to lower any excessively high lumps, and thus leave the earth in proper condition to receive the seed.

A beam 20 is fixed between the rear ends of the members 18 and 19 to brace them and for a means for attachment of conveyer-plates 21 and 22, the inner edges of which meet in a ridge which slopes downwardly and rearwardly, the rear outer edges of the spreader-plates being depressed. The ridge of the spreader-plates passes under the discharge-opening of the hopper, so that the seed dropped therefrom will fall thereon and dividing will pass partly on one side and partly on the other side and will roll down the spreader-plates into the furrow.

Coverers 25 and 26 in the form of arms are secured to the arms 8 and 9 and are disposed forwardly and convergingly, their forward ends lying against the side edges of the spreader-plates or adjacent thereto, so that they may engage the dirt at the sides of the furrow and turn it inwardly upon the seed.

Depending from the arms 8 and 9 at the rear ends thereof are plates 27 and 28, and in the lower ends thereof are journaled the end portions of a crank-shaft 29, upon which between said plates is fixed a roller 30 of such width or length as to thoroughly treat the entire width of the furrow into which the cottonseed has been discharged. These plates 27 and 28 are extended above the platform 5 and have the handles 31 and 32 fixed thereto, the forward ends of the handles being secured upon the platform 5 at the sides of the hopper.

Connected with the crank 33 of the shaft 29 is a connecting-rod 34, the opposite end of which is connected to the crank 35 of a crankshaft 36, passed laterally through the hopper, whereby when the roller is rotated during the progress of the implement the shaft 36 will be oscillated, the crank 35 being longer to insure this movement.

Upon the shaft 36 is mounted a block 37, having fingers 39 which are so disposed that when the shaft is oscillated these fingers will have a downward and forward movement in the direction of the discharge-opening of the hopper to feed the seed thereto.

With this construction it will be seen that the seed will be fed to the furrow which has been first made and then opened and smoothed, and the furrow will be then closed and rolled, and it will be understood that in practice various modifications of the specific construction shown may be made and that any suitable materials and proportions may be used for the various parts without departing from the spirit of the invention.

Having thus described the invention, what is claimed is—

A device of the class described comprising a platform having a hopper mounted thereon, said hopper being provided with a discharge-opening in its bottom, a furrow-opener carried in advance of the hopper, a plate secured to the forward face of the furrow-opener and having its ends directed outwardly and rearwardly of the opener, a beam secured to the ends of the plate and lying rearwardly of the opener, plates secured to the beam and disposed rearwardly and divergently therefrom, the adjacent edges of the plate being directed downwardly and in engagement with each other, said plates lying beneath the opening of the hopper to direct the seed into the furrow, coverers mounted rearwardly of the hopper and a roller disposed in the rear of the coverers.

In testimony whereof I affix my signature in presence of two witnesses.

IRVIN JANSON WILLCOX.

Witnesses:
J. A. GRIFFIN,
J. A. LINDSEY.